United States Patent [19]

Nisley

[11] Patent Number: 5,908,248
[45] Date of Patent: Jun. 1, 1999

[54] SHAFT BEARING HAVING IMPROVED SEAL ARRANGEMENT

[75] Inventor: Donald L. Nisley, Greenville, S.C.

[73] Assignee: Reliance Electric Industrial Company, Cleveland, Ohio

[21] Appl. No.: 08/966,772

[22] Filed: Nov. 7, 1997

Related U.S. Application Data

[63] Continuation of application No. 08/657,681, May 31, 1996, abandoned.

[51] Int. Cl.$^6$ .............................. F16C 33/74; F16C 33/76
[52] U.S. Cl. ........................... 384/140; 384/482; 384/486
[58] Field of Search ..................................... 384/472, 478, 384/481, 482, 484, 485, 486, 488, 140, 147

[56] References Cited

U.S. PATENT DOCUMENTS

| | | |
|---|---|---|
| 3,325,175 | 6/1967 | Lower . |
| 3,499,654 | 3/1970 | Lower . |
| 3,810,636 | 5/1974 | Gorski . |
| 3,934,953 | 1/1976 | Tooley . |
| 3,942,849 | 3/1976 | Doyle et al. . |
| 4,348,067 | 9/1982 | Tooley . |
| 4,411,437 | 10/1983 | Conti . |
| 4,575,265 | 3/1986 | Tooley . |
| 4,592,666 | 6/1986 | Jönhagen ................................. 384/482 |
| 4,632,404 | 12/1986 | Feldle et al. ............................. 384/140 |
| 4,763,904 | 8/1988 | Martinie . |
| 4,776,709 | 10/1988 | Tooley . |
| 4,792,242 | 12/1988 | Colanzi et al. .......................... 384/482 |
| 4,832,511 | 5/1989 | Nisley et al. . |
| 4,863,292 | 9/1989 | Dreschmann et al. .................. 384/482 |
| 4,875,786 | 10/1989 | DeWachter . |
| 4,906,111 | 3/1990 | Martinie . |
| 5,011,301 | 4/1991 | Martinie . |
| 5,022,659 | 6/1991 | Oho .......................................... 384/486 |
| 5,201,533 | 4/1993 | Lederman ................................. 384/147 |
| 5,207,436 | 5/1993 | Lederman ................................. 384/147 |
| 5,259,628 | 11/1993 | Nisley . |
| 5,387,040 | 2/1995 | Firestone et al. . |
| 5,489,156 | 2/1996 | Martinie . |
| 5,529,403 | 6/1996 | Martinie . |
| 5,536,090 | 7/1996 | Nisley . |

FOREIGN PATENT DOCUMENTS

| | | | |
|---|---|---|---|
| 0051170 | 5/1982 | European Pat. Off. ............... 384/486 |
| 0388258 | 9/1990 | European Pat. Off. ............... 384/482 |
| 2631672 | 11/1989 | France .................................... 384/482 |
| 2136891 | 9/1984 | United Kingdom ................... 384/486 |

*Primary Examiner*—John A. Jeffery
*Assistant Examiner*—Matthew A. Kaness
*Attorney, Agent, or Firm*—Patrick S. Yoder; John M. MIller; John J. Horn

[57] ABSTRACT

A bearing assembly includes an inner ring assembly defining a bore for receiving a shaft, and an outer ring assembly disposed radially outward from the inner ring assembly. A plurality of rotatable bearing elements are disposed between the inner and outer rings and permit the rotation of the shaft and inner ring relative to the outer ring. An annular member extends from the outer ring assembly radially inward toward the inner ring assembly. The annular member is secured to a housing surrounding the outer ring and axially bounds an area between the inner ring and the outer ring in which the plurality of rotatable bearing elements are disposed. A first seal is disposed outside the bearing area to seal a chamber between the annular member and the inner ring. The first seal permits egress of lubricant from the chamber but inhibits ingress of foreign matter therein. A second seal is disposed proximate the area and permits egress of lubricant between the inner ring and the annular member from the bearing area into the chamber, creating a lubricant dam between the first seal and the second seal.

17 Claims, 2 Drawing Sheets

SHAFT BEARING HAVING IMPROVED SEAL ARRANGEMENT

CROSS-REFERENCE TO RELATED APPLICATIONS

This application is a continuation of application Ser. No. 08/657,681, filed on May 31, 1996, now abandoned.

BACKGROUND OF THE INVENTION

The present invention generally concerns shaft bearings. More particularly, the invention relates to a shaft bearing having an improved seal arrangement.

Shaft bearings are typically designed having an inner ring and an outer ring, each defining an annular raceway situated in opposition to one another. Bearing elements are disposed in an area defined between the opposed raceways, thereby permitting the rotational displacement of the inner and outer rings with respect to one another. To facilitate this relative rotation, such bearings are generally configured so that a lubricant may occasionally be conducted into the bearing area.

In a typical configuration, lubricant is conducted under pressure into the bearing area. The bearing area is outwardly bounded by the outer ring and inwardly bounded by the inner ring such that a gap may exist between the outer and inner rings on one or both axial ends of the bearing area. To retain the pressurized lubricant, a seal assembly is often disposed in the open gap(s). Such a seal assembly may include an annular member, for example a metallic stamping, extending radially inward from the outer ring toward the inner ring. Because the inner ring rotates with respect to the outer ring, an appropriate gap is generally provided between the annular ring and the inner ring.

Accordingly, a resilient seal is often disposed on the inner ring to seal the gap between the inner ring and the annular ring. One such seal is disclosed in U.S. Pat. No. 4,575,265, the disclosure of which is incorporated herein by reference. The seal of the '265 patent is held in position against the annular ring by a collar which holds the bearing in position about a shaft. The seal is a V-ring type seal having an annular lip abutting the outer surface of the annular ring. This configuration allows lubricant in the bearing area to be forced out of the area beyond the seal but such that moisture and other foreign matter are inhibited from passing inwardly into the bearing area past the seal. Such an arrangement permits the purging of foreign material from the bearing area while protecting the bearing area from ingress of such foreign material.

SUMMARY OF THE INVENTION

The present invention recognizes and addresses disadvantages of prior art constructions and methods.

Accordingly, it is an object of the present invention to provide an improved shaft bearing.

It is a more particular object of the present invention to provide a shaft bearing having an improved seal arrangement.

It is another object of the present invention to provide a shaft bearing having a seal arrangement which permits egress of foreign matter from a bearing area but which inhibits ingress of such material.

One or more of these objects are accomplished by a bearing assembly having an inner ring assembly defining a bore for receiving a shaft therein. The inner ring assembly defines an inner race on an outer radial surface of the inner ring assembly. An outer ring assembly is disposed radially outward from the inner ring assembly. The outer ring assembly defines an outer race on an inner radial surface thereof. A separate housing may be disposed about the outer ring assembly.

A plurality of rotatable bearing elements are disposed between the inner race and the outer race. An annular member extends partially between the outer ring assembly and the inner ring assembly. Preferably, the annular member extends from the outer ring assembly radially inward toward the inner ring assembly. The annular member axially bounds an area between the inner ring assembly and the outer ring assembly in which the plurality of rotatable bearing elements are disposed. A first seal and a second seal are disposed proximate the annular member and are configured and disposed with respect to each other and the annular member to form a lubricant dam between the first and second seals.

Preferably, when the annular member extends from the outer ring assembly, the first seal is disposed outside the area to seal a chamber defined about a gap between the annular member and the inner ring to permit egress of lubricant from the chamber but to inhibit ingress of foreign matter into the chamber. The second seal is disposed within the area and is configured to permit egress of lubricant between the inner ring and the annular member from the area into the chamber to create a lubricant dam between the first seal and the second seal but to inhibit ingress of lubricant into the area from the lubricant dam.

Preferably, the annular member is a metal stamping. In a presently preferred embodiment, the first seal is a v-ring seal having a base portion seated on the inner ring assembly and an annular lip portion extending from the base to abut the stamping. A collar is disposed about the shaft to secure the shaft in position relative to the inner ring assembly. The base portion of the first seal is preferably seated on the inner ring assembly between the annular member and the collar.

In another presently preferred embodiment, the collar defines an annular seat on its outer radial surface. The base of the first seal is disposed in this seat so that the first seal sits on the collar some distance above the inner ring assembly. This embodiment is particularly suitable for bearings in which the axial space between the collar and the stamping is small, so that the first seal may be positioned on the outer edge of the collar and still arranged in sealing engagement with the stamping.

In either of the above embodiments, one preferable second seal is a land riding seal. Such a land riding seal may have a base section fixed to the inner side of the stamping and an annular lip portion extending from the base section over the gap between the stamping and the inner ring assembly to abut the inner ring assembly. The annular lip portion may have a cup-shaped cross section bowing inward toward the bearing area. In such a configuration, lubricant may pass between the annular lip and the inner ring assembly out of the bearing area but is inhibited by the land riding seal from passing back between the seal and the inner ring assembly into the area.

Because lubricant is forced into the bearing area under pressure, it may be forced out of the bearing area past the land riding seal. This lubricant passes through the gap between the stamping and the inner ring assembly into a lubricant dam between the land riding seal and the v-ring. If the v-ring is seated on the inner ring assembly, the lubricant dam is defined by the v-ring, the stamping, the land riding seal and the inner ring assembly. If the v-ring is seated on the collar, the lubricant dam is defined by the v-ring, the stamping, the land riding seal, the inner ring assembly and the collar.

Lubricant filling the lubricant dam may pass out of the bearing beyond the v-ring, thereby purging the bearing of contaminant material within the bearing area as described in the '265 patent. Lubricant filling the lubricant dam is inhibited from passing back into the bearing area. Should any foreign material get past the v-ring, it tends to be caught in the lubricant dam. Since lubricant in the dam is flushed out through the v-ring over time, such material tends to be expelled. The lubricant dam thus forms an additional seal protecting the bearing area from the ingress of foreign matter. Since the land riding seal also inhibits the ingress of foreign matter into the bearing area, three effective sealing mechanisms are formed in the present invention.

It should be understood by those of ordinary skill in this art that the present invention may be employed within various shaft bearing constructions. For example, single or multiple raceways may be used. The outer ring may be a single integral construction or may be divided into sections. Further, the outer ring may include an aligning ring as used in an expansion bearing. Additionally, one or more seal arrangements may be used in a bearing. For example, an axial gap may exist between the inner and outer rings on both axial sides of the bearing. In such a configuration, two seal arrangements would be used.

Other objects, features, and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
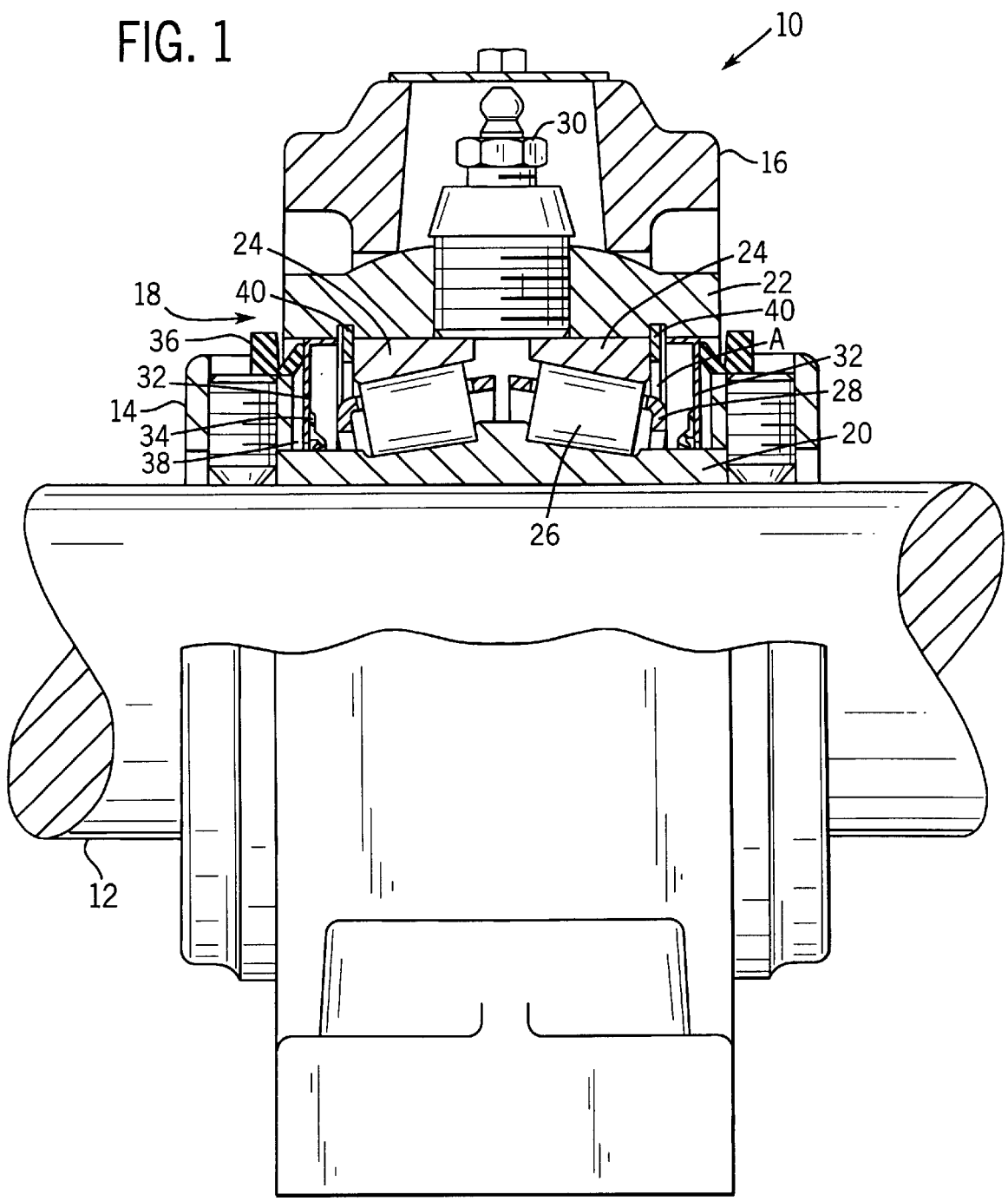
FIG. 1 is a cross-sectional view of a pillow block bearing constructed in accordance with the present invention.

Repeat use of reference characters in the present specification and drawings is intended to represent same or analogous features or elements of the invention.

DETAILED DESCRIPTION OF PREFERRED EMBODIMENTS

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 illustrates a pillow block bearing 10 receiving a shaft 12 secured by a collar 14. Bearing 10 includes a housing 16, an outer ring assembly 18 and an inner ring assembly consisting of inner ring 20. Outer ring assembly 18 includes a first outer ring 22 and axially aligned second outer rings 24. Second outer rings 24 are retained by respective snap rings 40. Those of ordinary skill in the art should recognize that both housing 16 and first outer ring 22 may be considered the "housing" of the bearing, while second outer rings 24 are considered the outer rings. For ease of explanation, however, first outer ring 22 and second outer rings 24 are together referred to as the outer ring assembly. Furthermore, it should be understood that the housing and outer ring assembly may be integrally constructed. This naming convention is not a limitation on the present invention.

A plurality of rotatable bearing elements 26 are disposed by cages 28 between inner ring 20 and second outer rings 24 to permit rotation of shaft 12 and inner ring 20 relative to housing 16 and outer ring assembly 18.

Lubricant is introduced into a bearing area A via a lubricant fitting 30 through first outer ring 22. Bearing area A is radially bounded by inner ring 20 and outer ring assembly 18 and axially bounded by stampings 32. Stampings 32 may be constructed, for example, of low carbon steel and press fitted into first outer rings 22. Lubricant in bearing area A is permitted to exit the bearing area by land riding seals 34 and through gaps between stampings 32 and inner ring 20. Such lubricant is collected in a chamber 38 bounded by collar 14, stamping 32, inner ring 20, land riding seal 34 and a v-ring 36 to form a lubricant dam. The seal arrangement including v-ring 36, stamping 32 and land riding seal 34 cooperate to effectively provide three seals that permit, as described in more detail below, purging of foreign material from bearing area A while inhibiting the ingress of such contaminants into the bearing area.

Figure 2:
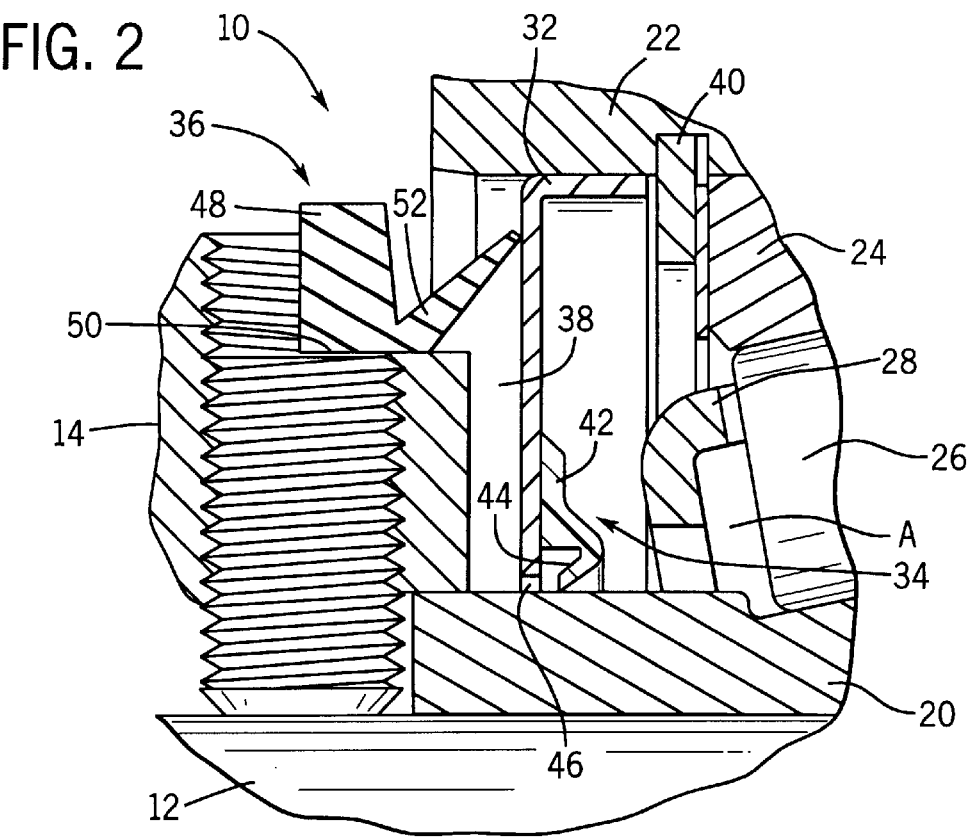
FIG. 2 is an enlarged partial and cross-sectional view of the shaft bearing sealing arrangement of FIG. 1 in which a v-ring seal is seated on an annular outer edge of a shaft collar.

FIG. 2 illustrates an enlarged view of the seal arrangement as illustrated in FIG. 1. Land riding seal 34 includes a base portion 42 adhesively molded to the inner wall of stamping 32 and an annular lip 44 that bows inward into bearing area A and abuts inner ring 20 such that lubricant under pressure in bearing area A may be forced between the seal and the inner ring and out of the bearing area through a gap 46 between stamping 32 and inner ring 20.

V-ring 36 includes a base portion 48, seated in a seat 50 defined in the outer radial edge of collar 14, and an annular lip 52 extending from base 48 to abut the outer edge of stamping 32. V-ring 36 is retained against stamping 32 such that lubricant within chamber 38 may be forced between lip 52 and stamping 32 but such that foreign matter such as moisture and other contaminants cannot pass back in the other direction.

Lubricant passing from bearing area A past land riding seal 34 through gap 46 fills chamber 38 defined by v-ring 36, collar 14, inner ring 20, land riding seal 34 and stamping 32 to form a lubricant dam. The lubricant dam exerts pressure on lip 52, encouraging the egress of lubricant from the lubricant dam out of the bearing. Thus, the seal arrangement provides a lubricant purging path to remove contaminant material introduced to the bearing.

The seal arrangement effectively provides three seals protecting against the ingress of contaminants into the bearing. The structure and placement of v-ring 36 and land riding seal 34 inhibit such ingress. The lubricant dam that forms between these two seals tends to remove contaminant material that may pass within the v-ring.

Figure 3:
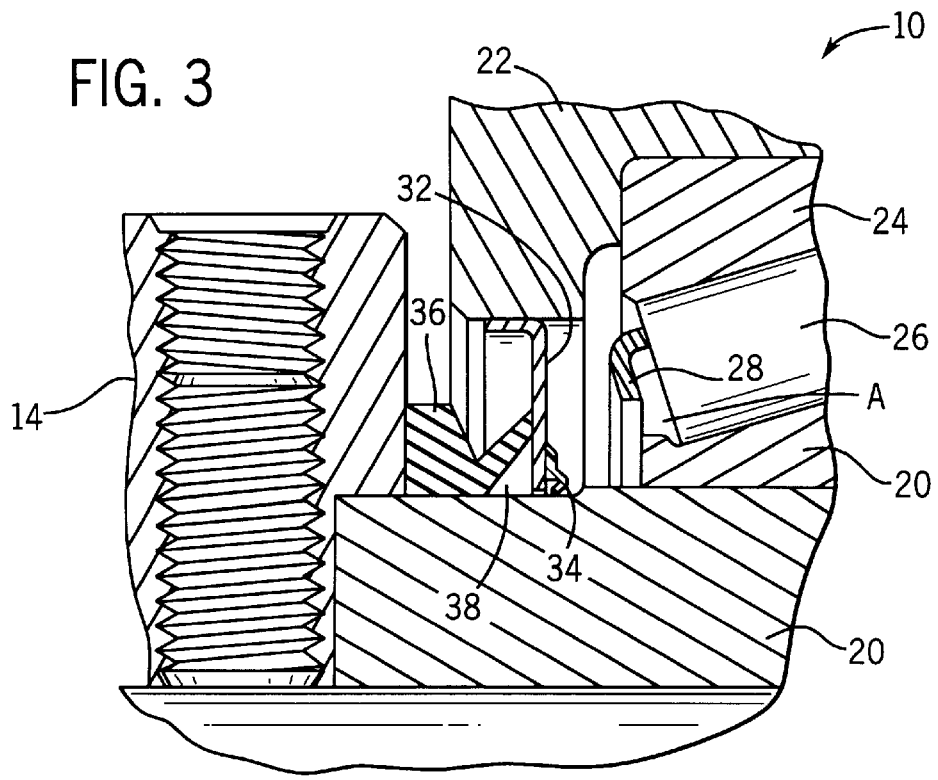
FIG. 3 is a partial cross-sectional view of a shaft bearing sealing arrangement constructed in accordance with the present invention in which a v-ring seal is seated on the bearing inner ring.

FIG. 2 partially illustrates a bearing in which the axial space between the collar and the stamping is suitable to position v-ring 36 on the outer edge of collar 14 to sealingly engage stamping 32 and thereby permit a relatively large lubricant dam. A shaft bearing in which the space between the inner and outer rings is not large enough to permit the positioning of the v-ring on the collar edge to engage the stamping is illustrated in FIG. 3. While it would be possible to construct a seal arrangement in which v-ring 36 is positioned on the outer radial edge of collar 14 to sealingly engage the housing or the outer ring 22, the v-ring in one preferable configuration is seated on inner ring 20, against collar 14, such that the v-ring sealingly engages stamping 32. As illustrated in FIG. 3, chamber 38 in which the lubricant dam collects is bounded by v-ring 36, inner ring 20, land riding seal 34 and stamping 32.

It should be understood that more than one annular member may be provided. For example, parallel stampings may be provided to increase the volume of the lubricant dam. The additional annular member or members may be positioned on either side of the first annular member and may extend up from the inner ring or down from the outer ring assembly. Accordingly, the chamber about the gap between the first annular member and the inner ring may take a variety of forms. Moreover, it should be understood that suitable configurations of one or more annular members disposed in conjunction with and between at least two seals configured to form a lubricant dam between the seals are within the scope of the present invention.

While preferred embodiments of the invention have been shown and described above, it is to be understood that any and all equivalent realizations of the present invention are included within the scope and spirit thereof. For example, the present invention may be embodied by various types and/or constructions of shaft bearings. Furthermore, various suitable seal types may be used for the first and second seals within and without the bearing area. Thus, the embodiments depicted are presented by way of example only and are not intended as limitations upon the present invention. Thus, while particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

What is claimed is:

1. The bearing assembly comprising:

an inner ring defining a bore for receiving a shaft therein and defining an inner race on an outer radial surface thereof;

an outer ring disposed radially outward from said inner ring, said outer ring defining an outer race on an inner radial surface thereof;

a plurality of rotatable bearing elements disposed between said inner race and said outer race;

a housing disposed about said outer ring;

a removable collar disposed about said shaft adjacent to said inner ring;

an annular member extending partially between said outer ring and said inner ring, said annular member being secured to said housing adjacent to said outer ring; and a first seal and a second seal, said first seal being disposed proximate said annular member on said collar, said collar defining an annular seat on an outer radial surface thereof, said first seal having a base portion seated in said seat and an annular lip portion extending from said base portion to abut said annular member, said first seal being removable with said collar, said first seal being configured to contact and ride against said annular member, said second seal being disposed on said annular member to contact and ride against said inner ring, whereby said first and second seals define a lubricant dam therebetween.

2. The bearing assembly as in claim 1, including a single said annular member and wherein said single annular member extends from said housing radially inward toward said inner ring.

3. The bearing assembly as in claim 1, wherein said collar is configured to secure a shaft in position relative to said inner ring.

4. A bearing assembly for supporting a shaft in rotation, said bearing assembly comprising:

an inner ring defining a bore for receiving a shaft therein and defining an inner race on an outer radial surface thereof;

an outer ring disposed radially outward from said inner ring, said outer ring defining an outer race on an inner radial surface thereof;

a housing disposed around said outer ring and supporting said outer ring;

a plurality of rotatable bearing elements disposed between said inner race and said outer race;

a removable collar fitted adjacent to said housing;

an annular member extending from said housing radially inward toward said inner ring, said annular member axially bounding an area between said inner ring and said outer ring in which said plurality of rotatable bearing elements are disposed;

a first seal disposed outside said area and on an outer radial surface of said collar and removable with said collar, said first seal contacting said annular member to seal a chamber defined between said annular member and said inner ring, said first seal configured to permit egress of lubricant from said chamber but to inhibit ingress of foreign matter into said chamber; and a second seal disposed proximate said area, contacting said inner ring and configured to permit egress of lubricant between said inner ring and said annular member from said area into said chamber to create a lubricant dam between said first seal and said second seal but to inhibit ingress of lubricant into said area from said lubricant dam.

5. The bearing assembly as in claim 4, wherein said housing includes a housing ring and an outer housing portion, the housing ring being disposed radially inward of said outer housing portion, said outer ring extending radially inward from said housing ring and defining said outer race, said annular member being secured to an inner annular face of said housing ring.

6. The bearing assembly as in claim 5, including two axially aligned said outer rings, said two outer rings defining two said outer races, wherein a plurality of said rotatable bearing elements are disposed between each of said outer races and a respective said inner race.

7. The bearing assembly as in claim 4, wherein said annular member is a metal stamping.

8. The bearing assembly as in claim 4, having two said annular members, each said annular member bounding said area on an opposite axial side of said area from the other said annular member, wherein said bearing assembly includes a said first seal and a said second seal associated with each of said annular members.

9. The bearing assembly as in claim 4, wherein said second seal contacts and rides on said inner ring during rotation of said inner ring.

10. The bearing assembly as in claim 9, wherein said second seal has a base section fixed to said annular member and an annular lip portion extending from said base to abut said inner ring.

11. The bearing assembly as in claim 4, wherein said first seal is a v-ring seal.

12. The bearing assembly as in claim 12, wherein said first seal has a base portion seated on said inner ring and an annular lip portion extending from said base portion to abut said annular member such that said lubricant dam is defined by said annular member, said first seal, said inner ring and said second seal.

13. The bearing assembly as in claim 12, wherein said collar is configured to secure said shaft in position relative to said inner ring.

14. A bearing assembly comprising:
an inner ring defining a bore for receiving a shaft therein and defining an inner race on an outer radial surface of said inner ring;
an outer ring disposed radially outward from said inner ring, said outer ring defining an outer race on an inner radial surface thereof;
a housing disposed about said outer ring;
a plurality of rotatable bearing elements disposed between said inner race and said outer race;
a pair of annular members secured to said housing and extending from said housing radially inward toward said inner ring, each said annular member bounding one of opposing axial sides of an area between said inner ring and said outer ring in which said plurality of rotatable bearing elements are disposed;
two first seals, each said first seal disposed outside said area in sealing engagement with corresponding said annular member to permit egress of lubricant from said area but to inhibit ingress of foreign matter into said area;

two second seals disposed within said area, each said second seal configured to permit egress of lubricant between said inner ring and a corresponding said annular member from said area into a lubricant dam between said second seal and a corresponding said first seal but to inhibit ingress of lubricant into said area from said lubricant dam;
wherein each said first seal has a base portion and an annular lip portion extending from said base portion to abut its said corresponding annular member such that its said corresponding lubricant dam is defined by said corresponding annular member, said first seal, said inner ring and said corresponding second seal; and
two collars disposed at opposite outer axial edges of said inner ring, each said collar configured to secure a shaft in position relative to said inner ring, wherein each said first seal is seated on an outer radial surface of a respective said collar and is removable with said collar for servicing.

15. A bearing assembly comprising:
an inner ring defining a bore for receiving a shaft therein and defining an inner race on an outer radial surface of said inner ring;
an outer ring disposed radially outward from said inner ring, said outer ring defining an outer race on an inner radial surface thereof;
a housing disposed about said outer ring;
a plurality of rotatable bearing elements disposed between said inner race and said outer race;
a pair of annular members extending from said housing radially inward toward said inner ring, each said annular member bounding one of opposing axial sides of an area between said inner ring and said outer ring in which said plurality of rotatable bearing elements are disposed;
two first seals, each said first seal disposed outside said area in sealing engagement with a corresponding said annular member to permit egress of lubricant from said a area but to inhibit ingress of foreign matter into said area;
two second seals disposed within said area, each said second seal configured to permit egress of lubricant between said inner ring and a corresponding said annular member from said area into a lubricant dam between said second seal and a corresponding said first seal but to inhibit ingress of lubricant into said area from said lubricant dam; and
two collars disposed at opposite outer axial edges of said inner ring, each said collar configured to secure a shaft in position relative to said inner ring and defining an outer annular seat on an outer radial surface thereof, wherein each said first seal has a base portion seated in a corresponding said seat and an annular lip portion extending from said base to abut said corresponding annular member such that said corresponding lubricant dam is defined by said corresponding annular member, said first seal, said inner ring, said corresponding collar and said corresponding second seal whereby said first seals are removable with said collars for servicing.

16. A bearing assembly comprising:
a first annular ring defining a first race;
a second annular ring defining a second race opposite said first race;
a plurality of rotatable bearing elements disposed between said first race and said second race to permit rotation of said first ring and said second ring relative to each other;

a housing surrounding and supporting said first and second annular rings;

a collar disposed adjacent to said housing;

an annular member secured to said housing and extending partially between said first ring and said second ring proximate an area between said first ring and said second ring in which said plurality of rotatable bearing elements are disposed; and a first seal and a second seal disposed proximate said annular member and being configured and disposed with respect to each other and said annular member to form a lubricant dam between said first seal and said second seal but to inhibit ingress of lubricant into said area from said lubricant dam, said first seal being disposed and supported on an outer annular seat of said collar for removal with said collar for servicing of said bearing assembly.

17. A bearing assembly comprising:

an inner ring defining a bore receiving a shaft therein and defining an inner race on an outer radial surface of said inner ring;

an outer ring disposed radially outward from said inner ring, said outer ring defining an outer race on an inner radial surface thereof;

a plurality of rotatable bearing elements disposed between said inner race and said outer race;

a housing surrounding and supporting said outer ring;

a collar disposed adjacent said inner ring and configured to secure a shaft in position relative to said inner ring, said collar having an outer annular seat;

an annular member extending from said housing radially inward toward said inner ring, said annular member axially bounding an area between said inner ring and said outer ring in which said plurality of rotatable bearing elements are disposed; and a seal disposed on said outer annular seat of said collar to seal a chamber defined about a gap between said annular member and said inner ring, said seal configured to permit egress lubricant from said chamber but to inhibit ingress of foreign matter into said chamber so that a lubricant dam is formed within said chamber, said seal being removable with said collar for servicing of said bearing assembly.

* * * * *